United States Patent
Matsumoto

(10) Patent No.: US 8,102,437 B2
(45) Date of Patent: Jan. 24, 2012

(54) IMAGE SENSING APPARATUS AND CONTROL METHOD THEREFOR WHEREIN THE FRAME RATE DURING AUTOFOCUS IS ADJUSTED ACCORDING TO A DETECTED FLICKER

(75) Inventor: Yukihiro Matsumoto, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 682 days.

(21) Appl. No.: 12/272,276

(22) Filed: Nov. 17, 2008

(65) Prior Publication Data

US 2009/0128683 A1 May 21, 2009

(30) Foreign Application Priority Data

Nov. 21, 2007 (JP) .................................. 2007-302076

(51) Int. Cl.
*H04N 9/73* (2006.01)
*H04N 5/235* (2006.01)

(52) U.S. Cl. .................. 348/226.1; 348/230.1; 348/345; 348/353; 396/127

(58) Field of Classification Search ................ 348/226.1
See application file for complete search history.

(56) References Cited

U.S. PATENT DOCUMENTS

| | | | |
|---|---|---|---|
| 6,683,652 B1* | 1/2004 | Ohkawara et al. | 348/347 |
| 6,744,466 B1* | 6/2004 | Furumiya | 348/280 |
| 7,733,413 B2* | 6/2010 | Onozawa | 348/353 |
| 7,733,414 B2* | 6/2010 | Kobayashi | 348/362 |
| 7,903,169 B2* | 3/2011 | Kobayashi | 348/362 |
| 2001/0035910 A1* | 11/2001 | Yukawa et al. | 348/349 |
| 2008/0303925 A1* | 12/2008 | Oota | 348/234 |
| 2010/0013953 A1* | 1/2010 | Niikura | 348/226.1 |
| 2010/0177236 A1* | 7/2010 | Suzuki et al. | 348/349 |

FOREIGN PATENT DOCUMENTS

JP 63-308484 12/1988

* cited by examiner

*Primary Examiner* — Clayton E LaBalle
*Assistant Examiner* — Bret Adams
(74) *Attorney, Agent, or Firm* — Cowan, Liebowitz & Latman, P.C.

(57) ABSTRACT

In a case in which flickers are detected from a live-view image, at least one of a start timing and an end timing of charge accumulation at an image sensor is fixed by setting the image-sensing frame rate during execution of image-sensing plane AF to a value synchronized with the flicker cycle. In an image sensing apparatus for carrying out image-sensing plane AF with the use of live-view images, aperture control and accumulation time control with a high degree of freedom can be achieved even under a flicking light source.

7 Claims, 5 Drawing Sheets

PROGRAM LINE FOR NORMAL CONTROL

PROGRAM LINE FOR 50 Hz FLICKER-REDUCTION CONTROL

IMAGE SENSING APPARATUS AND CONTROL METHOD THEREFOR WHEREIN THE FRAME RATE DURING AUTOFOCUS IS ADJUSTED ACCORDING TO A DETECTED FLICKER

BACKGROUND OF THE INVENTION

1. Field of the Invention

The present invention relates to an image sensing apparatus using an image sensor and to a control method therefor, and in particular, to an image sensing apparatus which has a focus detection function based on sensed images and a live-view function, and to a control method therefor.

2. Description of the Related Art

As an auto-focusing (AF) method to be used for image sensing apparatuses such as digital cameras and digital video cameras, methods based on contrast of a sensed image, such as a so-called hill-climbing search, are well known. Hereinafter, auto-focusing with the use of sensed images is referred to as image-sensing plane AF.

On the other hand, the functions unique to image sensing apparatuses that use image sensors include functions referred to as an electronic viewfinder or live view, in which the display device is allowed to function as a viewfinder by shooting a large number of images, for example, 30 frames or 60 frames of images per second with the use of an image sensor, and consecutively displaying the sensed images on the display device.

In the case of achieving live view, the number of images read from an image sensor per predetermined time period (shots per predetermined time period), that is, the frame rate, constrains the upper limit of the charge accumulation time at the image sensor, that is, the minimum speed of an electronic shutter.

Therefore, the brightness control for images to be used for live view (referred to as live-view images) is exercised by adjusting not only the charge accumulation time but also the aperture and the gain. As described above, the frame rate for live-view images is typically 30 frames/second, or double that at 60 frames/second. Further, as a method for brightness (exposure) control for live-view images, there is a typical method in which the charge accumulation time and gain are changed with the maximum aperture fixed. In this specification, such a method is referred to as normal control.

In a case in which image sensing is carried out with the use of an image sensing apparatus using an image sensor without synchronism in accumulation, such as a CMOS image sensor, under a light source with its brightness varying cyclically (flicking light source), typified by a fluorescent lamp, the sensed images are known to be affected by changes in brightness of the light source.

Therefore, when live view is carried out under a flicking light source with an image sensing apparatus using a CMOS image sensor, horizontal-striped line flickers will occur in live-view images as shown in FIG. 5, which is undesirable. The number of line flickers is unambiguously determined by the reading cycle (the interval in a vertical direction) for and the number of read lines for the CMOS image sensor.

Thus, during execution of live view, it is necessary to check if flickers occur in live-view images and remove or reduce the flickers, if any.

For example, in a case in which flickers are attributed to a fluorescent lamp, the flickers have a frequency corresponding to the frequency of the commercial power supply. Further, for example, in a case in which the frequency of the commercial power supply is 50 Hz, as for flickers attributed to the fluorescent lamp, line flickers are known to be able to be removed from live-view images by setting the charge accumulation time to 10 ms, 20 ms, 30 ms, or the like (Japanese Patent Laid-Open No. S63-308484).

More specifically, in a case in which it is necessary to remove flickers, brightness control for live-view images is exercised by discretely setting the accumulation time and adjusting the aperture and the gain, unlike normal control. In this specification, such a method for brightness control is referred to as flicker-reduction control.

However, when image-sensing plane AF is carried out with the use of live-view images, in a case in which flicker-reduction control is exercised by controlling the accumulation time, it is necessary to control the aperture during the live view with the accumulation time. Furthermore, the degree of freedom of the accumulation time itself is constrained. Then, with the aperture controlled, the depth of field will vary, or the degree of freedom for the control of the aperture will be constrained.

SUMMARY OF THE INVENTION

The present invention has been made in consideration of the problems of prior art, and has as its object to allow aperture control and accumulation time control to be exercised with a high degree of freedom even under a flicking light source in an image sensing apparatus for carrying out image-sensing plane AF with the use of live-images and in a control method therefor.

According to one aspect of the present invention, there is provided an image sensing apparatus comprising an image sensing unit for reading out a signal from an image sensor using a rolling shutter at a set frame rate to sense an image, comprising: a detection unit that detects the presence or absence of a flicker; a focus detection unit that carries out focus detection based on contrast of a sensed image; and a controller that sets the frame rate to a value that is synchronized with a frequency of the detected flicker if the detection unit detects a flicker, when the focus detection unit carries out focus detection.

According to another aspect of the present invention, there is provided a control method for an image sensing apparatus comprising an image sensing unit for reading out a signal from an image sensor using a rolling shutter at a set frame rate to capture an image, comprising: a detection step of detecting the presence or absence of a flicker; a focus detection step of carrying out focus detection based on contrast of sensed image; and a control step of setting the frame rate to a value that is synchronized with a frequency of the detected flicker if the detection step detects a flicker, when the focus detection is carried out in the focus detection step.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
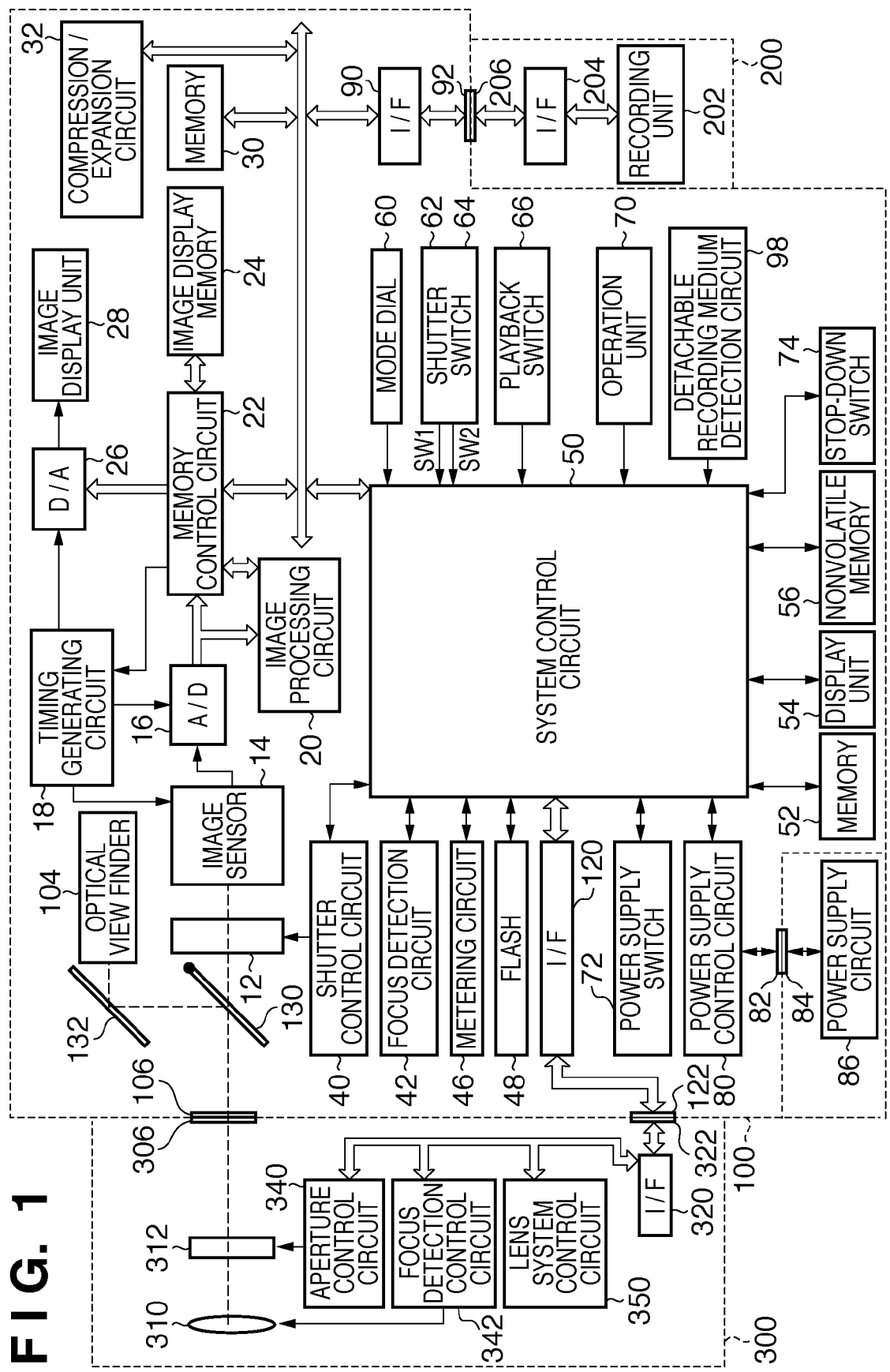
FIG. 1 is a block diagram illustrating an example of the configuration of a digital still camera with an interchangeable lens as an image sensing apparatus according to an embodiment of the present invention.

FIG. 1 is a block diagram illustrating an example of the configuration of a digital still camera with an interchangeable lens as an image sensing apparatus according to an embodiment of the present invention. The image sensing apparatus in the present embodiment is not limited to digital still cameras, and may be apparatuses which operate as a digital still camera. Such apparatuses include digital video cameras and cellular phones with digital cameras.

Reference numeral 12 denotes a shutter for controlling the exposure amount for an image sensor 14, and reference numeral 14 denotes the image sensor which converts optical images into electrical signals. In the present embodiment, the image sensor is an image sensor affected by a flicking light source, and specifically, for example, a CMOS image sensor.

Light beams entering a lens 310 forms, according to a single-lens reflex system, an optical image on the image sensor 14 through an aperture 312, lens mounts 306 and 106, a mirror 130, and the shutter 12.

An A/D converter 16 converts analog signals output from the image sensor 14 into digital signals.

A timing generating circuit 18 supplies clock signals and control signals to the image sensor 14, the A/D converter 16, and a D/A converter 26 in accordance with control exercised by a memory control circuit 22 and a system control circuit 50.

An image processing circuit 20 subjects data from the A/D converter 16 or data from the memory control circuit 22 to predetermined pixel interpolation processing and color conversion processing.

Further, in the image processing circuit 20, if necessary, predetermined arithmetic processing is carried out with the use of sensed image data. Then, based on the result of the arithmetic processing, the system control circuit 50 controls a shutter control circuit 40 and a focus detection circuit 42 to achieve TTL (Through The Lens) image-sensing plane AF (autofocus), image-sensing plane AE (automatic exposure), and image-sensing plane EF (flash dimming) processing. As described above, the image-sensing plane AF refers to a focus detection method based on sensed image contrast.

Moreover, in the image processing circuit 20, predetermined arithmetic processing is carried out with the use of sensed image data, and TTL-AWB (Auto White Balance) processing is also carried out based on the obtained result of the arithmetic processing.

It is to be noted that the digital still camera 100 (hereinafter, referred to simply as the camera 100) in the present embodiment has a configuration specially including the focus detection circuit 42 and a metering circuit 46. Therefore, instead of the image-sensing plane AF, image-sensing plane AE, and image-sensing plane EF with the use of the image processing circuit 20, the focus detection circuit 42 and the metering circuit 46 may be used to carry out AF processing, AE processing, and EF processing.

Alternatively, in addition to AF processing, AE processing, and EF processing with the use of the focus detection circuit 42 and the metering circuit 46, (image-sensing plane) AF processing, (image-sensing plane) AE processing, and (image-sensing plane) EF processing may be further carried out with the use of the image processing circuit 20.

The memory control circuit 22 controls the A/D converter 16, the timing generating circuit 18, the image processing circuit 20, an image display memory 24, the D/A converter 26, a memory 30, and a compression/expansion circuit 32.

The output data from the A/D converter 16 is written in the image display memory 24 or the memory 30 via the image processing circuit 20 and the memory control circuit 22 or directly via the memory control circuit 22.

The image data for display, which has been written in the image display memory 24, is displayed on an image display unit 28 such as an LCD or an organic EL display via the D/A converter 26.

In a case in which the live-view function is valid, sensing (charge accumulation) at the image sensor 14 and reading of the sensed image data are consecutively carried out in a predetermined cycle (frame rate), and the read image data is consecutively displayed on the image display unit 28 via the memory control circuit 22 and the D/A converter 26.

In addition, in the present embodiment, flicker detection is carried out with the use of the data of frame images continuously sensed by the image sensor 14, thereby enabling the flicking cycle to be obtained.

Then, in accordance with an instruction from the system control circuit 50, information indicating the state of the camera is also displayed instead of images on the image display unit 28. Specifically, for example, the following information is displayed: Single shooting/continuous shooting display; self-timer display; compression rate display; display of the number of recording pixels; display of number of shots taken; display of number of shots remaining; shutter speed display; aperture value display; exposure compensation display; flash display; red-eye reduction display; macro photography display; buzzer setting display; display of the remaining battery capacity for clocking; display of the remaining battery capacity; error display; information display with multi-digit numbers; display of the state of a detachable recording medium 200; display of the state of a detachable lens unit 300; display of communication I/F operation; date and time display; and display indicating a connection state with an external computer.

Further, there are various warnings for informing abnormalities detected by the camera, which include, for example, fatal warnings for informing that shooting or recording is not possible, displayed when the recording medium 200 is detected to have no space left or needs to be formatted, or when the memory required for shooting cannot be obtained, and further include warnings for reminders, displayed when the recording medium is not mounted.

In addition, the image display unit 28 is able to switch the display between ON/OFF at will in accordance with an instruction from the system control circuit 50, and in a case in which the display is switched to OFF, the power consumption of the digital still camera can be reduced.

The memory 30 is a storage device for storing sensed still images or moving images, and has a sufficient storage capacity to store a predetermined number of still images or moving images for a predetermined period of time. Therefore, in the case of continuous shooting in which a plurality of still images are continuously shot, or of panoramic shooting, a large number of images can be written in the memory 30 at high speed.

In addition, the memory 30 can also be used as a work area for the system control circuit 50.

The compression/expansion circuit 32 loads the image data stored in the memory 30, compresses the loaded image data in accordance with a predetermined image compression method, and writes the compressed image data in the memory 30. Further, the compression/expansion circuit 32 can load the compressed image data from the memory 30, expand the image data, and write the expanded image data in the memory 30. It is to be noted that an image compression method defined by JPEG, JPEG 2000, or the like, or an image compression method with the use of adaptive discrete cosine transform (ADCT), wavelet transform, or the like can be used for the predetermined image compression method.

The shutter control circuit 40 controls the shutter 12 based on metering information from the metering circuit 46. The shutter control circuit 40 exercises this control while cooperating with an aperture control circuit 340 for controlling the aperture 312.

The focus detection circuit 42 is used for AF processing. In the single-lens reflex system, light beams entering the lens 310 are directed to the focus detection circuit 42 through the aperture 312, the lens mounts 306 and 106, the mirrors 130 and 132, and a sub-mirror for focus detection, not shown in the figure. Then, the focus detection circuit 42 measures the in-focus states for images formed as optical images.

The metering circuit 46 is used for AE processing. In the single-lens reflex system, light beams entering the lens 310 are directed to the metering circuit 46 through the aperture 312, the lens mounts 306 and 106, the mirrors 130 and 132, and a lens for metering, not shown in the figure. Then, the metering circuit 46 measures the exposure states for images formed as optical images.

In addition, the metering circuit 46 also carries out EF processing by cooperating with a flash 48 of the image sensing apparatus.

The flash 48 also has a floodlighting function with AF fill light and a flash dimming function.

The system control circuit 50 controls the entire camera 100. The system control circuit 50 is, for example, a CPU, which controls the entire camera 100 by executing a program stored in a memory 52. The memory 52 stores constants, variables, programs, and the like for the operation of the system control circuit 50.

A display unit 54 is composed of, for example, a combination of a LCD or a LED with an output unit such as a speaker, and outputs operational states, messages, and the like with the use of characters, images, sound, and the like, in response to execution of a program in the system control circuit 50. The display unit or display units 54 are placed in the easily visible position(s) near an operation unit 70 of the camera 100. In addition, a portion of the display unit 54 is placed in an optical viewfinder 104.

Of the information displayed on the display unit 54, information displayed on the LCD or the like includes the following as examples: Single shooting/continuous shooting display; self-timer display; compression rate display; display of the number of recording pixels; display of the number of shots taken; display of the number of shots remaining; shutter speed display; aperture value display; exposure compensation display; flash compensation display; red-eye reduction display; buzzer setting display; display of the remaining battery capacity; error display; information display with multi-digit numbers; display of the state of the detachable recording medium 200; display of the state of the detachable lens unit 300; display of communication I/F operation; date and time display; and display indicating a connection state with an external computer.

Further, of the information displayed on the display unit 54, information displayed in the optical viewfinder 104 includes the following as examples: In-focus display; display of shooting preparation completed; display of camera shake warning; flash charging display; shutter speed display; aperture value display; exposure compensation display; and display of recording medium writing operation.

Furthermore, of the information displayed on the display unit 54, information displayed on the LED or the like includes, for example, display of recording medium writing operation.

In addition, of the information displayed on the display unit 54, information displayed with a lamp or the like includes, for example, a self timer notification lamp. This self timer notification lamp may be shared with AF fill light.

A nonvolatile memory 56 is an electrically erasable and recordable memory, for which an EEPROM or the like is used, for example.

The following components are operated members for inputting various operation requests into the system control circuit 50: A mode dial 60; a first shutter switch (SW1) 62; a second shutter switch (SW2) 64; a playback switch 66; a live-view ON/OFF button 68; the operation unit 70; and a stop-down switch 74. These operated members are composed of buttons, switches, dials, touch panels, line-of-sight detectors, voice recognizers or a combination thereof.

Now, these operated members will be specifically described.

The mode dial 60 is a switch for setting one of multiple functional shooting modes provided for the camera 100. The functional shooting modes include, for example, the following modes as examples: An automatic shooting mode; a program shooting mode; a shutter-priority AE mode; an aperture-priority shooting mode; a manual exposure mode; a depth-of-focus priority (depth) shooting mode; a portrait shooting mode; a landscape shooting mode; a close-up photography mode; a sport shooting mode; a night-view shooting mode; and a panoramic shooting mode.

The first shutter switch (SW1) 62 is turned ON with a first stroke (for example, pressing halfway) of a shutter button (not shown) provided on the camera 100. When the first shutter switch (SW1) 62 is turned ON, the system control circuit 50 initiates AF processing, AE processing, AWB processing, EF processing, and the like.

The second shutter switch (SW2) 64 is turned ON with a second stroke (for example, pressing fully) of the shutter button provided on the camera 100. When the second shutter switch (SW2) 64 is turned ON, the system control circuit 50 instructs the initiation of a series of processing composed of exposure processing, development processing, and recoding processing. First, in the exposure processing, signals read out from the image sensor 14 are written in the memory 30 as image data via the A/D converter 16 and the memory control circuit 22. Then, this image data is subjected to development processing using arithmetic processing at the image processing circuit 20 and the memory control circuit 22, and the result is written in the memory 30. Furthermore, the developed image data is read out from the memory 30 and compressed in the compression/expansion circuit 32, and recording processing is then carried out for writing the image data in the recording medium 200. It is to be noted that the development processing, compression processing, or the like is partially skipped in a CCD-RAW mode.

The playback switch 66 is a switch for instructing the initiation of a playback operation in which a sensed image is read out from the memory 30 or the recording medium 200 and displayed on the image display unit 28 in a shooting mode.

The live-view ON/OFF button 68 is a button for switching between validity and invalidity of the live-view function. In a case in which the live-view function is valid, the shooting and display processing described above are consecutively carried out so that the image display unit 28 functions as an electronic viewfinder.

The operation unit 70 is a man-machine interface with switches, buttons, rotating dial switches, touch panels, and the like.

The image recording mode, compression rate, image quality, and the like of the sensed images can be selected by the operation unit 70. The image recording mode includes a JPEG mode and a CCDRAW mode. The JPEG mode refers to an image recording mode in which sensed images are compressed in accordance with a JPEG compression method and recorded on the recording medium 200 or the like. The CCDRAW mode refers to an image recording mode in which digital data obtained by digitalizing signals from the image sensor 14 is not compressed or is compressed in accordance with a lossless compression method, and recorded on the recording medium 200 or the like. It is to be noted that the compression rate and image quality in the JPEG mode can also be selected by the operation unit 70.

The operation unit 70 includes the following as examples: A menu button; a set button; a multi-screen playback page break button; a flash setting button; a single shooting/continuous shooting/self timer switching button; a menu migration+ (plus) button; a menu migration−(minus) button; a playback image migration+(plus) button; a playback image migration−(minus) button; a shooting image quality selection button; an exposure compensation button; a flash compensation button; a date/time setting button; an image display ON/OFF switch for setting ON/OFF of the image display unit 28; a quick review ON/OFF switch for setting a quick review function of automatically playing back image data sensed immediately after the shooting; a compression mode switch for selecting the compression rate in JPEG compression or selecting the CCDRAW mode; a playback switch for setting each functional mode such as a playback mode, a multi-screen playback/erase mode, and a PC connection mode; an AF mode setting switch for selecting a one-shot AF mode or a servo AF mode. It is to be noted that the one-shot AF mode refers to a mode in which auto-focusing operation is initiated when the first shutter switch SW1 (62) is turned on and the in-focus state is kept once the in-focus state has been obtained, whereas the servo AF mode refers to a mode in which auto-focusing operation is continuously carried out while the first shutter switch SW1 (62) is ON.

Each function of the plus buttons and minus buttons can also be implemented by providing a rotating dial switch and relating the directions of rotation to the plus and the minus.

A power supply switch 72 switches and sets each of power-on and power-off modes for the camera 100. Further, the power supply switch 72 can also switch and set power-on and power-off settings for various attached devices such as the lens unit 300 and recording medium 200 connected to the camera 100.

A power supply control circuit 80 is composed of a battery detection circuit, a DC-DC converter, a switch circuit for switching a block to which power is to be distributed, and the like. The power supply control circuit 80 detects the presence or absence of a battery installed, the type of the battery, the remaining battery capacity, controls the DC-DC converter based on the result of the detection and on instructions from the system control circuit 50, and supplies required voltages to a range of units including the recording medium 200 for a required period of time.

Reference numeral 82 denotes a connector, and a power supply circuit 86 is composed of a primary battery such as an alkaline battery or a lithium battery, a secondary battery such as a NiCd battery or a Li battery, an AC adapter, and the like.

Reference numeral 90 denotes an interface with the recording medium 200 such as a memory card or a hard disk. Reference numeral 92 denotes a connector for providing the connection to the recording medium 200. A detachable recording medium detection circuit 98 detects whether or not the recording medium 200 is mounted on the connector 92.

It is to be noted that the present embodiment has been described with the assumption that a single interface and connector are provided on which the recording medium is mounted. However, of course, multiple interfaces and connector may be provided on which the recording medium is mounted. In addition, in such a case, differently standardized interfaces and connectors may be provided in combination. The interfaces and connectors may be composed of PC cards, CF (compact flash (registered trademark)) cards, or the like in conformity with the standards.

Further, in a case in which the standardized interface 90 and connector 92 are used, image data and accompanying management information can be mutually transferred to and from other peripherals such as computers and printers by connecting a variety of communication cards. The variety of communication cards here include communication cards such as a LAN card, a modem card, a USB card, an IEEE1394 card, a SCSI cars, and a PHS.

The optical viewfinder 104 can, according to the single-lens reflex system, guide light beams entering the lens 310 via the aperture 312, the lens mounts 306 and 106, and the mirrors 130 and 132, and form an image as an optical image, thereby allowing shooting to be carried out with the use of only the optical viewfinder 104, without the use of the electronic viewfinder function provided by the image display unit 28.

Reference numeral 120 denotes an interface provided in the lens mount 106 for connecting the camera 100 to the lens unit 300. Reference numeral 122 denotes a connector for electrically connecting the camera 100 to the lens unit 300.

The connector 122 exchanges control signals, status signals, data signals, and the like between the camera 100 and the lens unit 300, and also has the function of supplying currents at various voltages. Further, the connector 122 may have a configuration for not only telecommunication but also optical communication and voice communication.

Reference numerals 130 and 132 denote mirrors which can, according to the single-lens reflex system, guide light beams entering the lens 310 to the optical viewfinder 104. It is to be noted that the mirror 132 may have a configuration of either a quick return mirror or a half mirror.

Reference numeral 200 denotes a recording medium such as a memory card or a hard disk. The recording medium 200 includes a recording unit 202 composed of a semiconductor memory, a magnetic disk, or the like, an interface 204 with the camera 100, and a connector 206 for providing the connection to the camera 100.

Reference numeral 300 denotes an interchangeable lens-type lens unit.

Reference numeral 306 denotes a lens mount for mechanically coupling the lens unit 300 with the cameral 100. The lens mount 306 includes various functions for electrically connecting the lens unit 300 to the camera 100.

Reference numeral 310 denotes a lens, and reference numeral 312 denotes a controllable aperture.

Reference numeral 320 denotes an interface for connecting the lens unit 300 to the camera 100 in the lens mount 306, and reference numeral 322 denotes a connector for electrically connecting the lens unit 300 to the camera 100.

The connector 322 exchanges control signals, status signals, data signals, and the like between the camera 100 and the lens unit 300, and also has the function of being supplied with or supplying currents at various voltages. Further, the connector 322 may have a configuration for not only telecommunication but also optical communication and voice communication.

The aperture control circuit 340 controls the controllable aperture 312 provided in the lens unit 300, based on metering information from the metering circuit 46. This control is exercised while cooperating with the shutter control circuit 40 for controlling the shutter 12.

The aperture control circuit 340 further controls the aperture 312 to reach the aperture value displayed on the display unit 54 when the stop-down switch 74 is operated.

A focus detection control circuit 342 controls focusing of the lens 310.

A lens system control circuit 350 controls the entire lens unit 300. The lens system control circuit 350 has, for example, a CPU, a volatile memory, and a nonvolatile memory, built in. The volatile memory stores constants, variables, programs, and the like used for operation. Further, the nonvolatile memory holds identification information such as a number unique to the lens unit 300, management information, the maximum aperture value and minimum aperture value, functional information such as a focal length, a range of current and previous set values, and the like.

Next, live-view operation of the camera 100 according to the present embodiment will be described with reference to the flowchart shown in FIG. 2. This live-view operation is also implemented by the system control circuit 50 controlling the required constituent elements.

Figure 2:
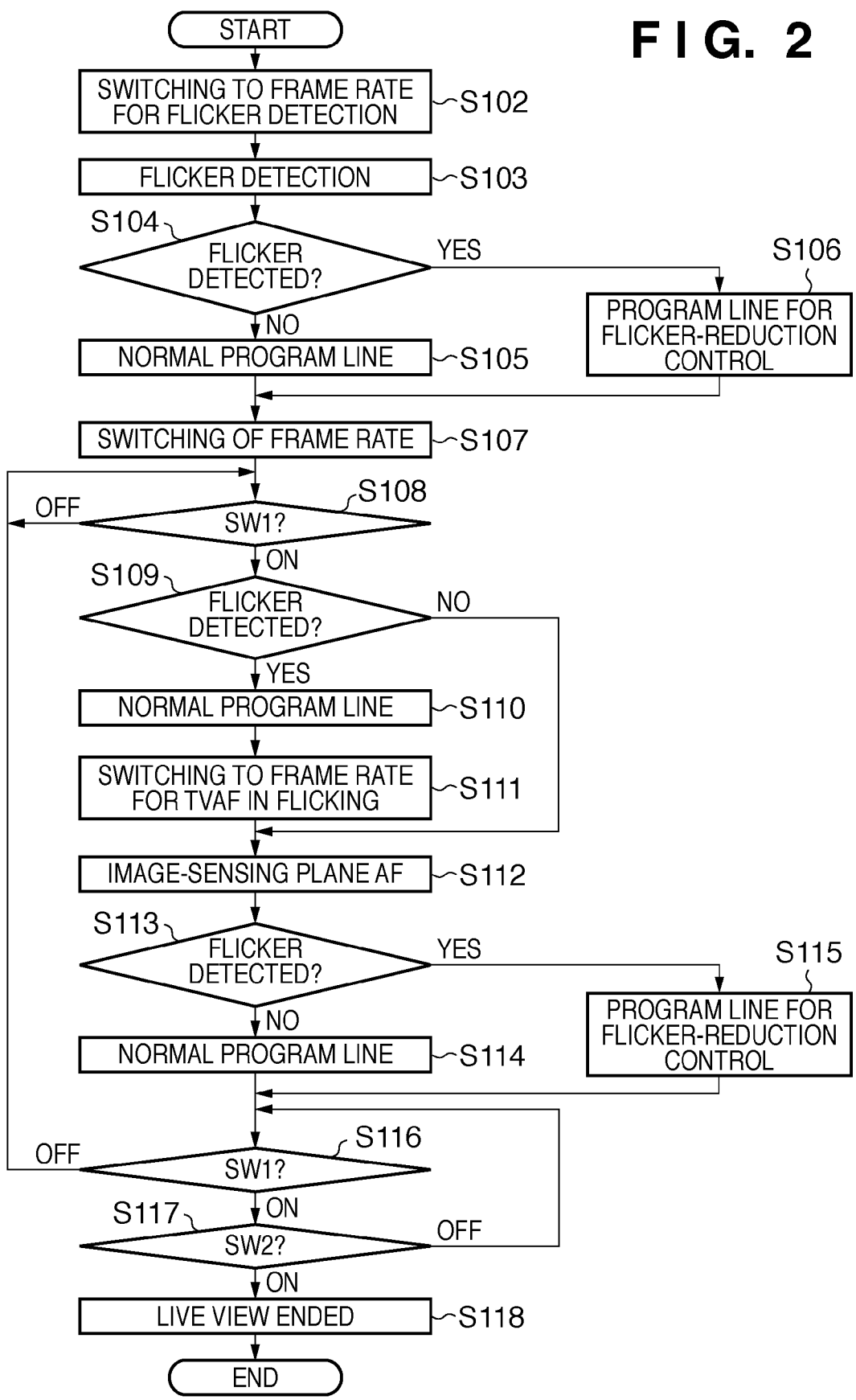
FIG. 2 is a flowchart showing live-view operation in the camera according to the embodiment of the present embodiment.

When the operation of the live-view ON/OFF button 68 validates the live-view function, the system control circuit 50 initiates processing shown in FIG. 2.

First, the system control circuit 50 controls the image sensor 14, the timing generating circuit 18, the image processing circuit 20, and the like so that live view is carried out at a frame rate for flicker detection (S102).

Typically, flickers of fluorescent lamps occur in synchronization with the frequency of the commercial power supply. Therefore, the flicker frequency is 50 Hz or 60 Hz in Japan. In the present embodiment, a frame rate that is not synchronized with the flicker cycle is set in order to detect flickers from continuously sensed live-view images. That is, a frame rate is set as a frame rate for flicker detection such that the positions of flickers which occur in continuously sensed live-view images are shifted.

Specifically, the frame rate of the live view is set to a value that is shifted by a half cycle with respect to an expected flicker cycle. For example, in a case in which the frequency of the commercial power supply is 50 Hz, 67 fps ($\frac{1}{15}$), 40 fps ($\frac{1}{25}$), 28 fps ($\frac{1}{35}$), 22 fps ($\frac{1}{45}$), or the like is set as the frame rate for flicker detection.

In the present embodiment, it will be assumed that a frequency corresponding to 22 fps is employed as the frame rate of the live view for flicker detection so that flickers can be detected at commercial power supply frequencies of both 50 Hz and 60 Hz.

Next, the system control circuit 50 carries out flicker detection with the use of live-view images sensed at the frame rate for flicker detection (S103).

Figure 3A:
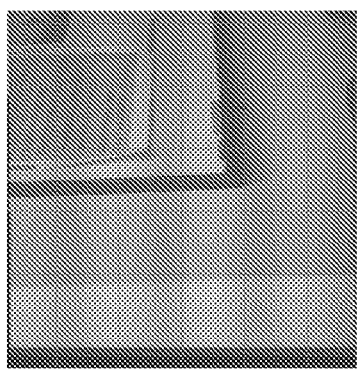
FIGS. 3A to 3D are diagrams for explaining a flicker detection method in the camera according to the embodiment of the present invention.
Figure 3B:
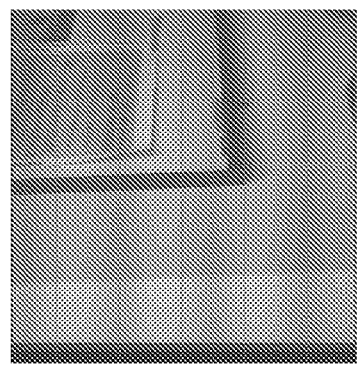

Under a flicking light source, the live-view images sensed at the above-described frame rate for flicker detection have flickers (line flickers) occurring in positions shifted between consecutive frames. FIGS. 3A and 3B show examples of specific live-view images.

Figure 3C:
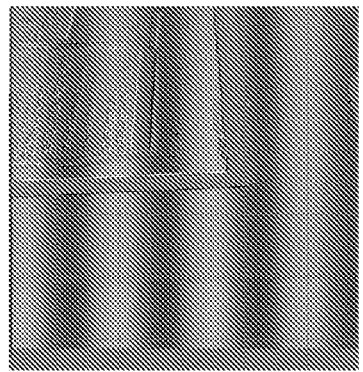
Figure 3D:
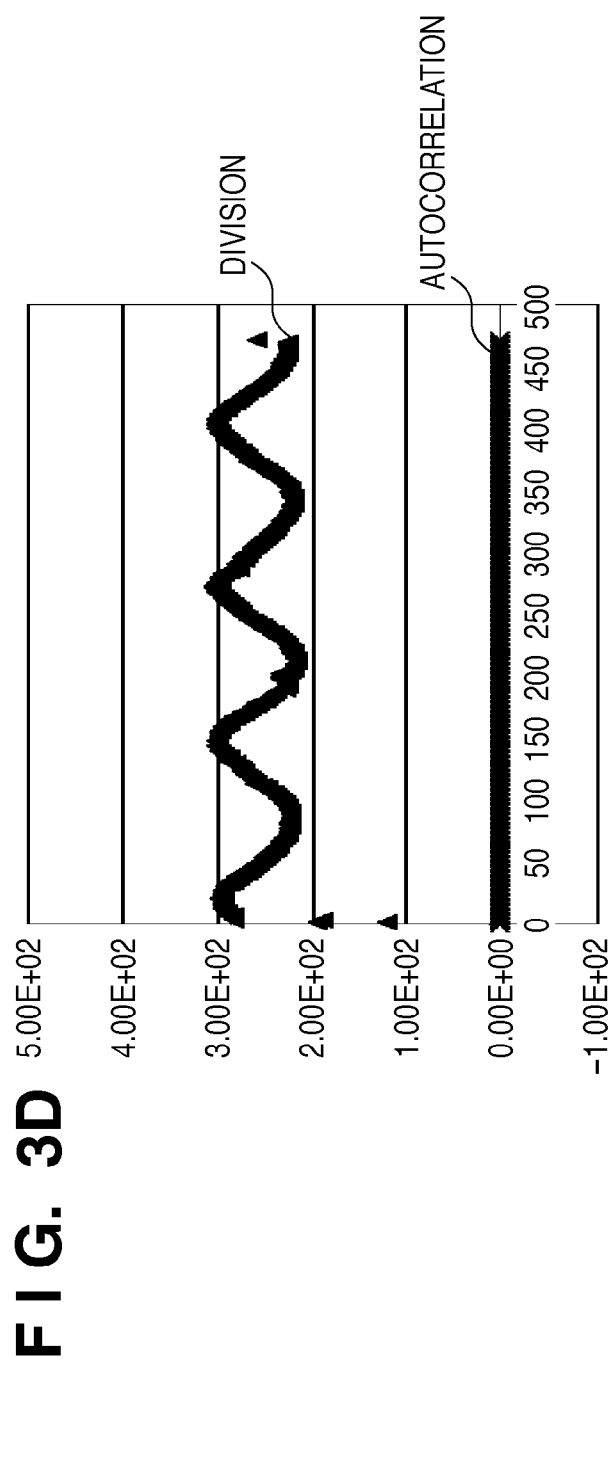

When mapping along the time axis (the vertical direction of the image) is carried out by generating a differential image between the two frames of live-view images thus continuously sensed to obtain a ratio therebetween, an image as shown in FIG. 3C is obtained. FIG. 3D shows variations in the brightness of the image shown in FIG. 3C, where the horizontal axis and the vertical axis respectively indicate the position on a horizontal line (0 is the uppermost line) and a brightness level.

The presence or absence, amplitude, frequency, and the like of sine-wave flicker components can be detected and extracted in the vertical direction from FIG. 3D.

It is to be noted that flicker detection can be carried out by any other method as well.

For example, flicker components can also be detected by dividing the average brightness value of live-view images by a value obtained by applying a low-pass filter to the average brightness value.

The frame rate for flicker detection is different from frame rates for use in normal live view. Thus, in the present embodiment, flicker detection is carried out at this stage before carrying out live view at a frame rate for normal live view.

In a case in which no flicker can be detected as a result of the flicker detection in S103 (S104), the system control circuit 50 sets, as a normal program line, a program line for use in brightness control (exposure control) of live-view images (S105). More specifically, a program line with a high degree of freedom is selected for carrying out normal control in which the charge accumulation time and gain are changed with the maximum aperture.

On the other hand, in a case in which flickers are detected in S103, the system control circuit 50 sets, as a program line for flicker-reduction control, a program line for use in exposure control of live-view images (S106). More specifically, a program line is selected for carrying out flicker-reduction control in which the charge accumulation time is discretely set while the aperture and gain are adjusted.

Figure 4A:
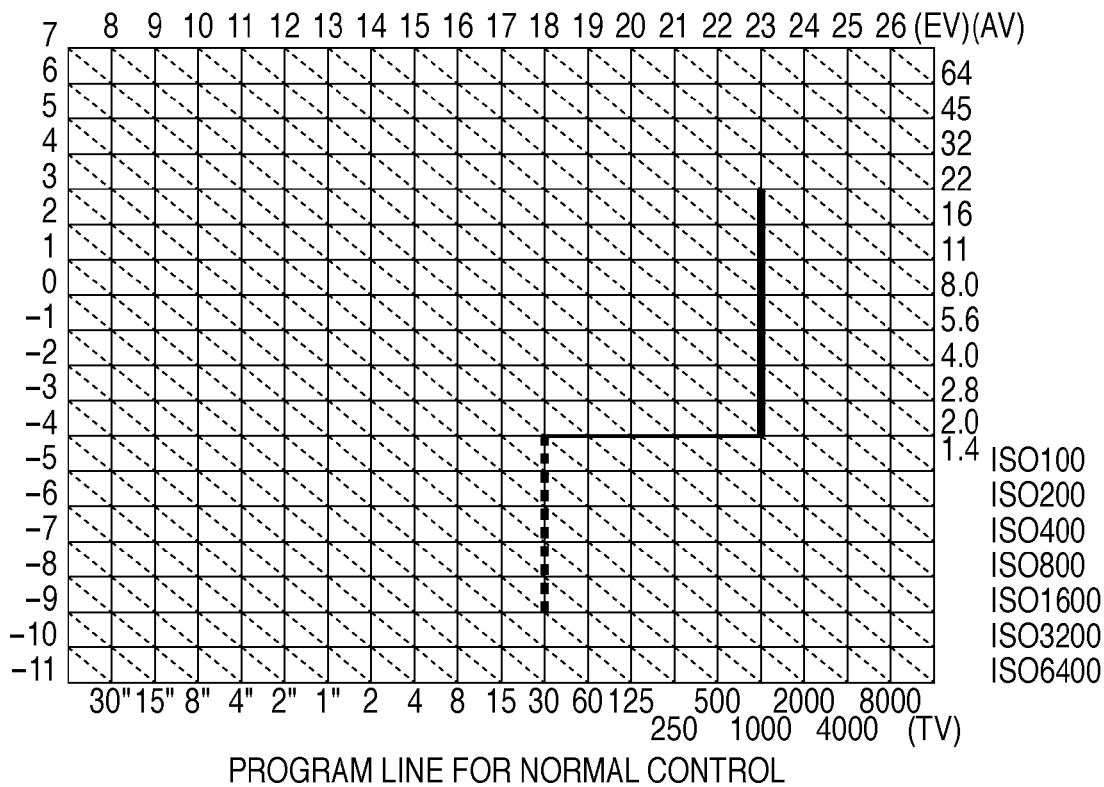
FIGS. 4A and 4B are diagrams showing examples of a program line to be used for brightness control of live-view images by the camera according to the embodiment of the present invention.
Figure 4B:
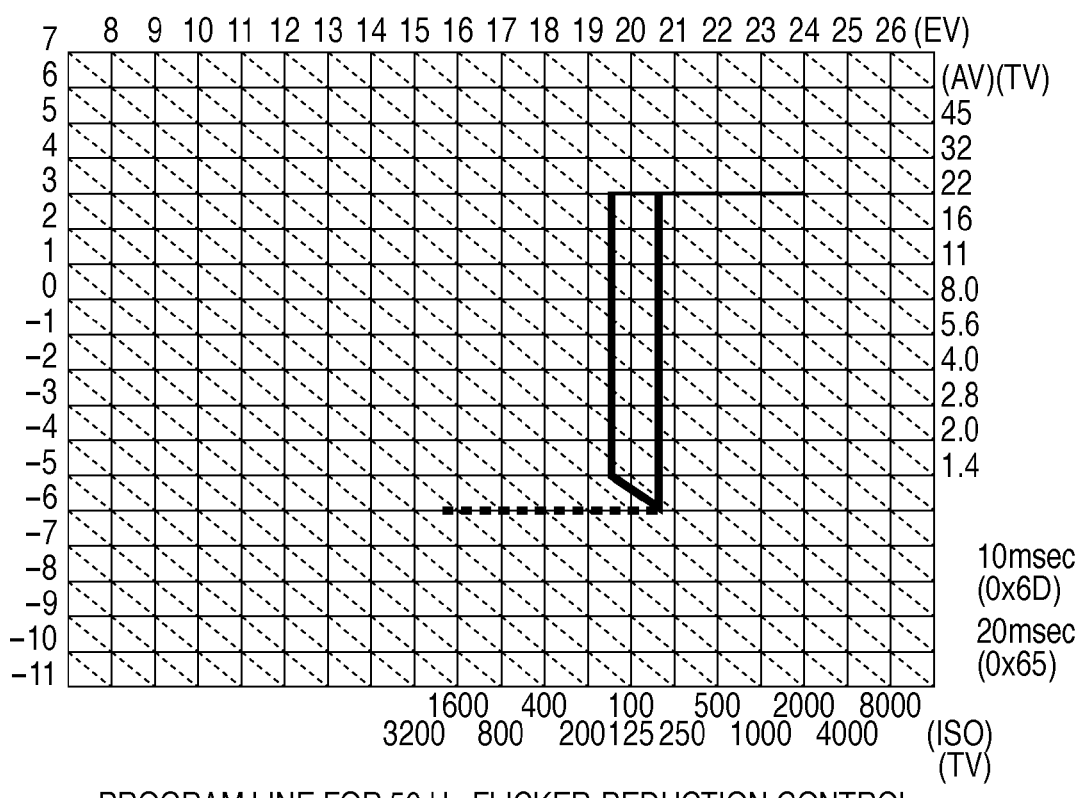
Figure 5:
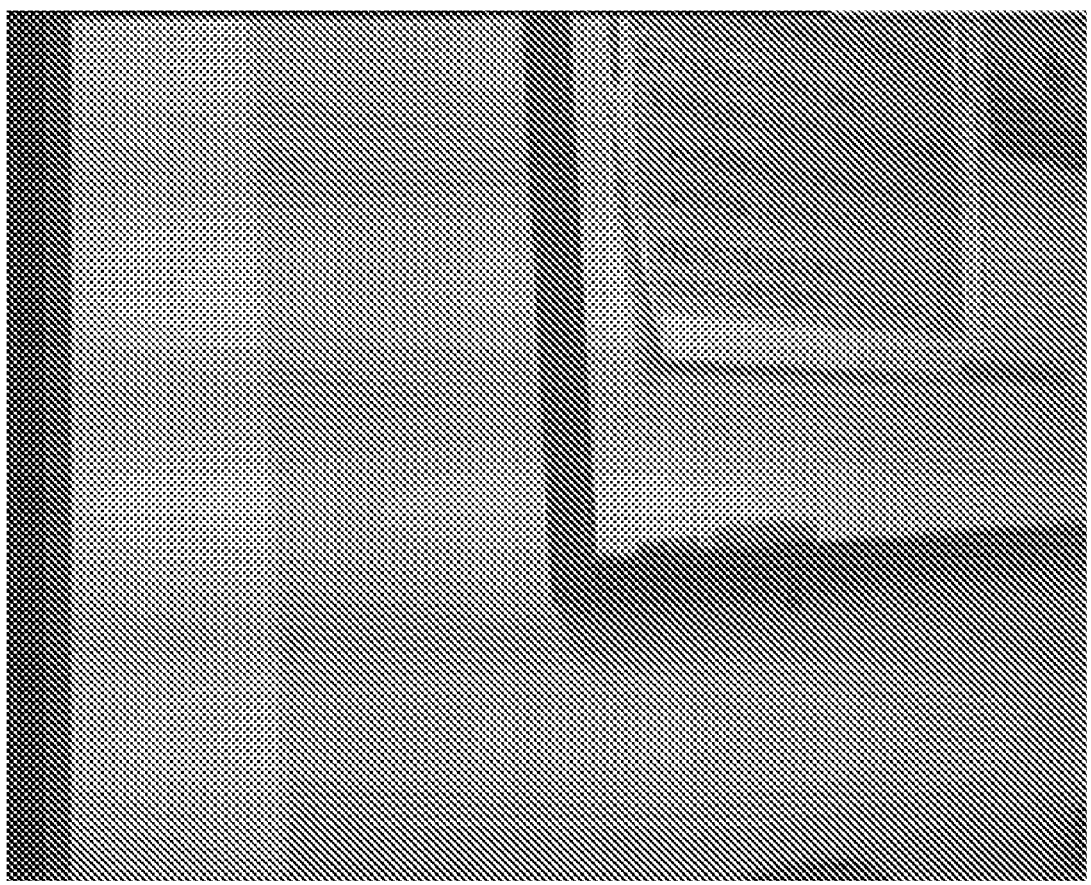
FIG. 5 is a diagram showing an example of a live-view screen affected by a flicking light source.

FIGS. 4A and 4B are diagrams illustrating examples of program lines for normal control and flicker-reduction control for use by the camera according to the present embodiment. The program lines are examples of brightness control patterns for use by the camera 100.

FIG. 4A shows a program line for normal control, whereas FIG. 4B shows a program line for flicker-reduction control. The frame rate of the live view is 30 frames/second.

The program line for normal control, shown in FIG. 4A, is used for exercising brightness control giving priority to fixing the aperture. Specifically, brightness control is exercised by varying the charge accumulation time or the electronic shutter speed from $\frac{1}{30}$ seconds to second with the maximum aperture (1.4 or 2.0) in a predetermined brightness zone.

By contrast, in a case in which the exposure is insufficient even when the charge accumulation time is set with the maximum aperture to the longest time ($\frac{1}{30}$ seconds here) constrained by the frame rate, brightness control is exercised by increasing the gain (shooting sensitivity).

Alternatively, in a case in which an image is overexposed even when the charge accumulation time is set with the maximum aperture to the shortest time ($\frac{1}{1000}$ second here) predetermined by a clock frequency or the like, brightness control is exercised by narrowing the aperture.

On the other hand, the program line for flicker-reduction control in FIG. 4B is used for exercising brightness control giving priority to fixing the charge accumulation time to a time in which the effect of flickers can be removed. Specifically, at the brightness value (EV) of 16 or less at which the effect of flickers is recognized, the charge accumulation time is fixed at 10 ms (1/100 second) or 20 ms in the case of flickers with a frequency of 50 Hz in order to remove the flickers. FIG. 4B shows an example in which the charge accumulation time is fixed to 20 ms. Then, brightness control is exercised by adjusting the aperture and sensitivity (gain).

In the case of flickers with a frequency of 60 Hz, the charge accumulation time is fixed at 8.3 ms, 16.6 ms, 24.9 ms, or the like to exercise similar brightness control.

At high brightnesses of EV of 16 or more, the effect of flickers becomes difficult to see on images. Thus, as in normal control, the charge accumulation time is adjusted with the aperture fixed (fixed at an aperture value of 22 in FIG. 4B) to exercise brightness control.

When flicker detection is carried out to select a program line in accordance with the result of the flicker detection, the system control circuit 50 sets a primary frame rate (30 frames/second here) as a frame rate for live view (S107).

Then, the system control circuit 50 exercises control of live-view display with live-view images which have been sensed with the use of the program line selected in S105 or S106, while checking the state of the switch to be checked, such as SW1 (62) (S108).

When the system control circuit 50 detects the SW1 (62) is turned on in S108, the system control circuit 50 checks the result of the flicker detection in S103 (S109).

In a case in which flickers are detected, the aperture may be changed in the flicker-reduction control switched in step S106 and step S115 described below. However, when the aperture is changed, the depth of field will be changed. Therefore, when image-sensing plane AF based on live-view images is carried out, the change in the depth of field due to the change in the aperture will affect control for focusing, rendering intended control for focusing impossible. Therefore, in the case of carrying out image-sensing plane AF, it is necessary to switch to normal control with the maximum aperture.

Then, with normal control under a flicking light source, it is not possible to remove flickers of live-view images. Further, since the flicker frequency (50 Hz) is not synchronized with the frame rate (30 frames/second or 60 frames/second) of the live view, the positions of line flickers will be changed for each live-view image (the line flickers will appear to flow in the vertical direction).

Accordingly, since the positions of line flickers in the live-view images are changed even when normal control is exercised, a difference in the brightness of the focus detection region is caused between the presence and absence of line flickers even when the sensed range remains constant. Since this difference in the brightness results in a cause for errors in image-sensing plane AF, the focus detection accuracy will be eventually decreased even in the case of switching to normal control.

In this regard, the following allows image-sensing plane AF with a high degree of accuracy to be achieved even in a case in which image-sensing plane AF is carried out with the use of live-view images under a flicking light source.

First, the system control circuit 50 switches brightness control of live-view images to exercise control with the program line for normal control, in a case in which flickers are detected (S110).

Further, the system control circuit 50 switches the frame rate of the live view to a predetermined value (for example, 25 frames/second) that can be synchronized with the flicker cycle (S111).

Specifically, the frame rate f for focus detection for the image-sensing plane is expressed as follows with the flicker frequency F (Hz):

$$f=(2\times F)/n \text{ (}n\text{: positive integer)}$$

At least one of the start timing and end timing of charge accumulation at the image sensor 14 can be fixed by setting the frame rate f to a value synchronized with the detected flicker frequency in this way. More specifically, migration of line flickers can be prevented by carrying out charge accumulation at the fixed start timing or end timing with respect to the detected flicker frequency.

Further, when the start timing or end timing of the charge accumulation time is fixed with respect to the flicker frequency, line flickers will be changed only in contrast even if the charge accumulation time is longer or shorter, and migration of the line flickers can still be thus prevented.

In S112, the system control circuit 50 carries out image-sensing plane AF with the use of the image processing circuit 20, based on live-view images sensed while controlling the focus detection circuit 42 to drive a focusing lens in the lens unit 300.

Since migration of line flickers is prevented as described above, image-sensing plane AF can be carried out with a high degree of accuracy even if line flickers occur, because the image-sensing plane AF makes a relative comparison of the contrast between frames.

When focus detection by the image-sensing plane AF is completed, the system control circuit 50 again checks if flickers are detected in order to exercise live-view control before the image-sensing plane AF (S113).

Then, the system control circuit 50 continues the live-view display while keeping the use of the program line for normal control, in a case in which no flickers are detected (S114). On the other hand, in a case in which flickers are detected, the system control circuit 50 continues the live-view display by going back to the program line for flicker-reduction control (S115).

After that, the system control circuit 50 checks the state of the SW1 (62) (S116), and moves the process to S108 when the state of the SW1 (62) is OFF or further checks the state of the SW2 (64) when the SW1 (62) is kept ON (S117).

In a case in which the SW2 (64) is ON, the system control circuit 50 ends the live-view display (S118), and moves the process to image-sensing processing. On the other hand, when the SW2 (64) is OFF, the system control circuit 50 returns the process to S116.

As described above, according to the present embodiment, live-view display with the frame rate changed is carried out only when flickers are detected and when automatic focusing is controlled with the use of live-view images, in an image sensing apparatus that carries out live-view display.

In addition, when automatic focusing is controlled, setting the frame rate to a frame rate that is synchronized with flickers allows live-view display that is not affected by the flickers to be carried out even under a flicking light source. As a result, in image sensing in which image-sensing plane AF is carried out with the use of live-view images, aperture control and accumulation time control can be carried out with a high degree of freedom even under a flicking light source. Further, control of automatic focusing with the use of live-view images can be exercised with a high degree of accuracy.

Furthermore, according to the present embodiment, conventional configurations can be used as they are without change, and it is not necessary to newly add complex components to the configurations. Therefore, the present invention is also advantageous in terms of cost saving.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-302076, filed on Nov. 21, 2007, which is hereby incorporated by reference herein its entirety.

What is claimed is:

1. An image sensing apparatus comprising an image sensing unit for reading out a signal from an image sensor using a rolling shutter at a set frame rate to sense an image, comprising:
   a detection unit that detects the presence or absence of a flicker;
   a focus detection unit that carries out focus detection based on contrast of a sensed image; and
   a controller that sets the frame rate to a value that is synchronized with a frequency of the detected flicker if the detection unit detects a flicker, when the focus detection unit carries out focus detection.

2. The image sensing apparatus according to claim 1, wherein the controller sets an accumulation time of the image sensor to a time independent of the frequency of the flicker, when the focus detection unit carries out focus detection.

3. The image sensing apparatus according to claim 1, wherein the controller sets the frame rate to a value that is synchronized with the frequency of the detected flicker, and sets a brightness control pattern for fixing a controllable aperture provided in a lens system and carrying out charge accumulation of the image sensor for a time corresponding to the fixed aperture.

4. The image sensing apparatus according to claim 1, wherein the controller sets the frame rate to a value that is not synchronized with the frequency of a commercial power supply, when the detection unit detects the presence or absence of a flicker.

5. The image sensing apparatus according to claim 1, wherein the controller sets the frame rate to a value that is shifted by a half cycle with respect to an expected flicker cycle, when the detection unit detects the presence or absence of a flicker.

6. The image sensing apparatus according to claim 1, wherein the controller sets the frame rate to a predetermined value for live view, and sets a brightness control pattern for exercising brightness control giving priority to fixing the charge accumulation time for the image sensor to a time at which an effect of the flicker can be reduced, for a period of time for which the detection unit detects a flicker and the focus detection unit carries out no focus detection.

7. A control method for an image sensing apparatus comprising an image sensing unit for reading out a signal from an image sensor using a rolling shutter at a set frame rate to capture an image, comprising:
   a detection step of detecting the presence or absence of a flicker;
   a focus detection step of carrying out focus detection based on contrast of sensed image; and
   a control step of setting the frame rate to a value that is synchronized with a frequency of the detected flicker if the detection step detects a flicker, when the focus detection is carried out in the focus detection step.

* * * * *